Figure 1:
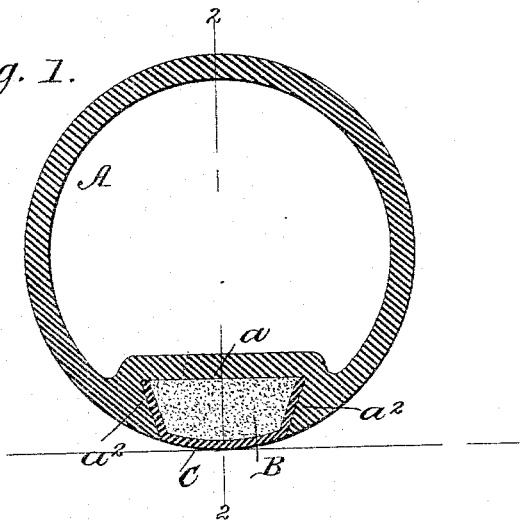
Figure 2:
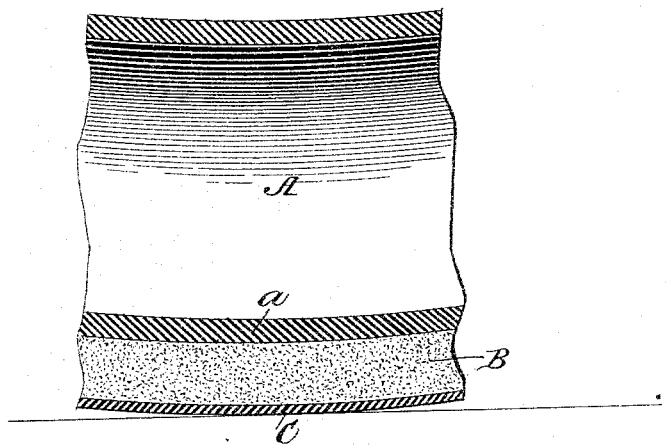

(No Model.)

J. J. KOETZNER.
PNEUMATIC TIRE.

No. 533,820.    Patented Feb. 5, 1895.

WITNESSES:
Fred G. Dieterich
Edw. W. Byrn.

INVENTOR
John J. Koetzner.
BY Munn & Co.
ATTORNEYS.

tic rubber tube having an annular groove of an undercut or dovetail cross section pressed from the exterior inwardly, a filling of resistant material, and a detachable covering for said pocket arranged upon the outside in the circle of the outer periphery of the tube and having both its edges cemented in divergent position to the side walls of the groove or pocket, substantially as and for the purpose described.

JOHN J. KOETZNER.

Witnesses:
EDWD. W. BYRN,
SOLON C. KEMON.